United States Patent [19]

Lagg

[11] 4,213,734
[45] Jul. 22, 1980

[54] TURBINE POWER GENERATOR

[76] Inventor: Jerry W. Lagg, 15246 Collingham, Detroit, Mich. 48205

[21] Appl. No.: 926,254

[22] Filed: Jul. 20, 1978

[51] Int. Cl.² ............................ F03D 7/04; F03D 1/04
[52] U.S. Cl. .......................................... 415/4; 415/7; 416/41; 416/189
[58] Field of Search ...................... 415/122 A, 7, 2-4; 416/132 B, 189 A, 176 A, 240 A, 149, 37, 41, 51, 53

[56] References Cited

U.S. PATENT DOCUMENTS

| 532,595 | 1/1895 | Seivert et al. | 415/7 |
| 725,829 | 4/1903 | Decker | 416/149 X |
| 1,186,289 | 6/1916 | Dalen | 415/2 A |
| 1,333,675 | 3/1920 | Pickett | 416/53 |
| 2,133,853 | 10/1938 | Feige | 416/133 X |
| 2,374,125 | 4/1945 | Peirce | 416/176 X |
| 2,563,279 | 8/1951 | Rushing | 415/3 |
| 4,066,911 | 1/1978 | Sarchet | 416/132 B X |
| 4,159,191 | 6/1979 | Graybill | 416/41 X |

FOREIGN PATENT DOCUMENTS

| 217155 | 3/1957 | Australia | 416/133 |
| 5087 | of 1893 | United Kingdom | 416/132 B |

*Primary Examiner*—Everette A. Powell, Jr.
*Attorney, Agent, or Firm*—Hauke and Patalidis

[57] ABSTRACT

A reaction-type turbine provided with an output shaft coupled to a power generator, such as an electric generator, and having a plurality of variable-pitch flexible impeller blades, or sails, mounted between the periphery of the output shaft and a concentric tubular shroud rotatable in unison with the output shaft. The pitch of the flexible impeller blades or sails is varied by a centrifugally-actuated pitch controlling unit such that the output shaft has a constant angular velocity irrespective of variations in the velocity of the fluid flowing through the turbine. For actuation by wind, the turbine is mounted on a rotatable platform which is automatically oriented in the direction of the prevalent wind by a servo system controlled by a wind direction detecting device. The mass of air flowing through the turbine is automatically controlled as a function of the wind velocity by an appropriate throttling mechanism controlled by a wind velocity detector. For actuation by water flow, the turbine is mounted such as to be retractable and extendable relative to an appropriate support hull.

12 Claims, 10 Drawing Figures

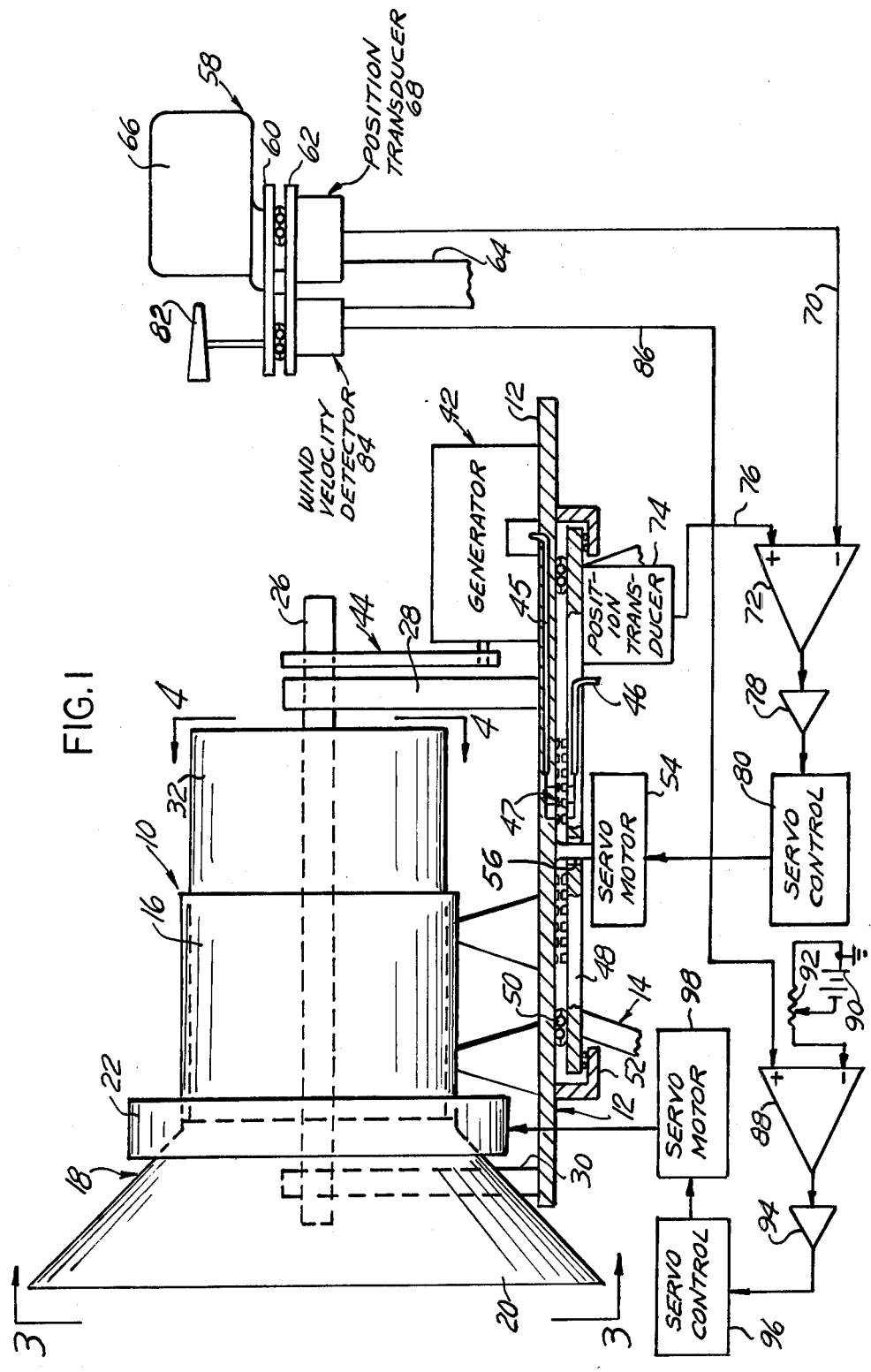

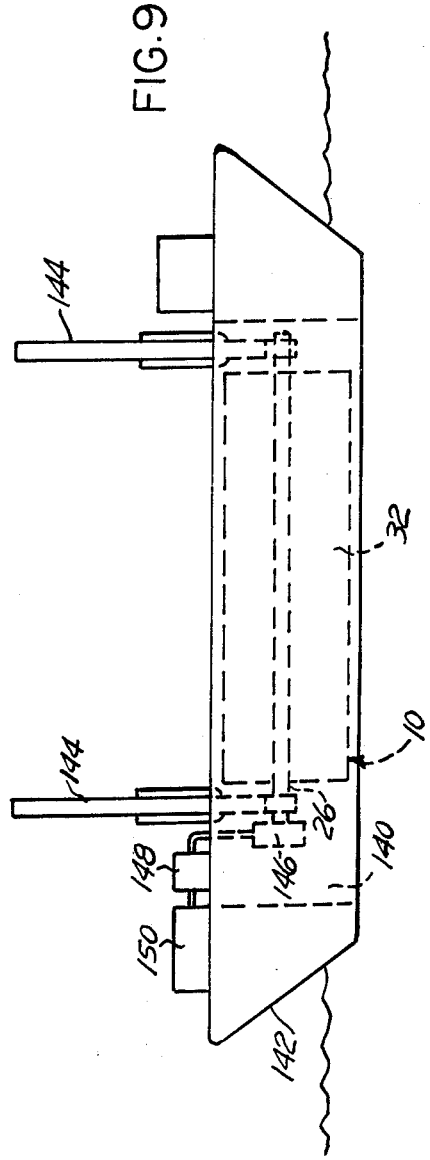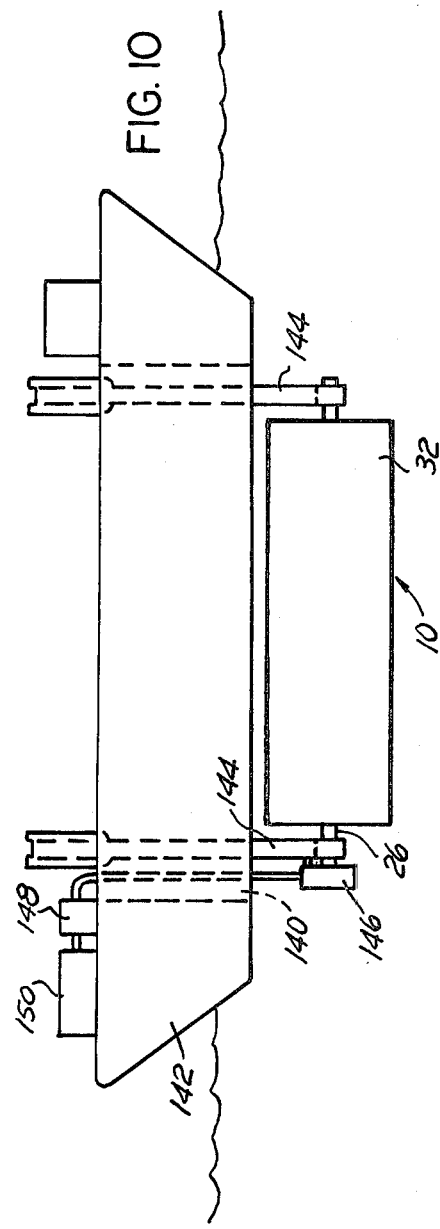

TURBINE POWER GENERATOR

BACKGROUND OF THE INVENTION

For many centuries man has attempted to harness the force of wind for operating countless mechanisms such as grain crushing mills, water pumps, and more recently electrical generators. With this object in mind, diverse windmill designs have been developed in the past, all limited in operational capability within a relatively narrow range of wind velocity. In order to widen the range of usable wind velocity, a means must be devised either for accelerating the velocity of the air flow acting on the impellers of the power generating device at low wind velocities, or for reducing the velocity of the air flow past the impeller blades, or alternatively throttling the air flow, at high wind velocities. Alternatively, variable pitch impeller blades may be used with appropriate governor systems for varying the pitch as a function of wind velocity to maintain the angular velocity of the output shaft substantially constant.

In addition, wind actuating devices must be able to orient themselves in the average wind direction. Small, light wind-actuated devices may be made self-orienting by being rotatably supported around a vertical axis and by being provided with an appropriate wind-orienting vane. More powerful and heavy devices require appropriate wind orientation means capable of orienting the axis of the wind-actuated device generally along the axis of the direction of prevailing wind, without hunting or too much delay.

The present invention provides a reaction-type turbine of a novel design which, although relatively light in construction, is capable of producing considerable output power when constructed at a large scale, which is automatically oriented in alignment with the average direction of the prevailing wind, and which provides, at its output shaft, a constant angular velocity.

SUMMARY OF THE INVENTION

The present invention accomplishes its objects and purposes by providing a reaction-type wind turbine, whose structural and operating principles can also be used in a water flow turbine, and which is provided with a plurality of relatively elongated impeller elements in the form of flexible blades, or sails, regularly disposed extended between a central shaft and a peripheral shroud rotatable in unison with the shaft. A portion of the chord of each impeller blade, or sail, from proximate the leading edge to the trailing edge of the blade or sail, is capable of being oriented with a variable pitch by means of a pitch-adjusting ring to which the top end of the trailing edge of each flexible blade or sail is attached. The pitch-adjusting ring is rotatable, relative to a second ring fixedly mounted relative to the shroud, by centrifugal force, such that the pitch is decreased as a function of the increase of angular velocity of the output shaft and is decreased as a function of angular velocity. For operation by wind, the reaction-type turbine of the invention is further provided with remote control wind direction orienting means, such that the turbine constantly faces the direction of prevailing wind, and with remote control wind velocity detecter means throttling the amount of air flowing through the turbine within a given time.

These and other objects and advantages of the present invention will become apparent to those skilled in the art when the following description of the best modes contemplated for practicing the invention is read in conjunction with the accompanying drawing wherein:

BRIEF DESCRIPTION OF THE DRAWING

FIG. 1 is a side elevation view, partly in section and partly schematic, of a wind turbine according to the present invention;

FIG. 9 is a schematic illustration of a hull-mounted water flow actuated power generator according to the present invention; and FIG. 10 is a view similar to FIG. 9 but showing the power generator extended from the hull.

DETAILED DESCRIPTION OF THE PREFERRED EMBODIMENTS

Figure 3:
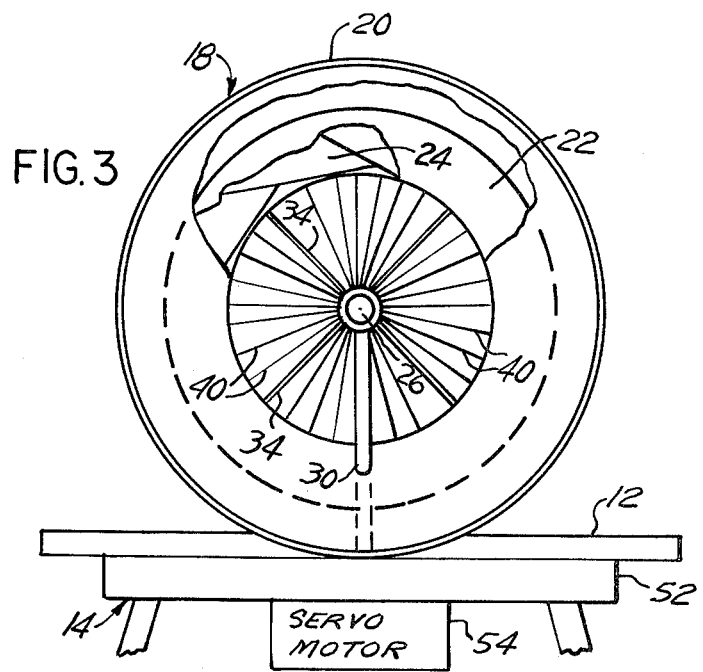
FIG. 3 is a front end view from line 3—3 of FIG. 1, with portions broken away.

Referring to the drawing, and more particularly to FIG. 1, a power generator according to an aspect of the present invention takes the form of a reaction-type wind turbine, generally designated at 10, mounted on a rotatable platform 12 supported on the top of a superstructure 14, such as a tower, a pedestal mounted on a building rooftop, or the like.

The wind turbine 10 comprises a stationary annular housing 16 provided with a forwardly disposed header or variable rate induction assembly 18 which, in the structure illustrated, takes the form of a ram-effect funnel-shaped inlet collector 20 provided with an air flow throttle mechanism which, as best shown at FIG. 3, is in the form of an annular housing 22, disposed downstream of the inlet collector 20, and containing a variable area iris diaphragm mechanism 24. Alternatively, the funnel-shaped induction assembly 18 may be provided with power-actuated clam shells such as to vary the cross area of the inducted air passageway through the induction system.

Figure 7:
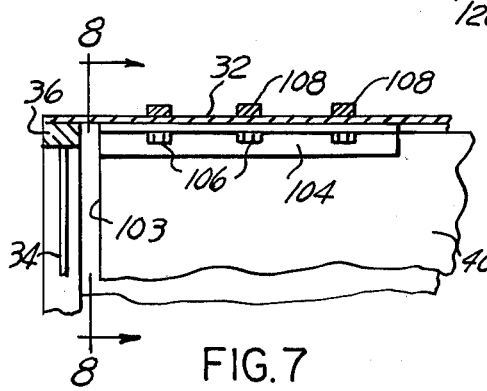
FIG. 7 is a partial schematic view illustrating an example of fastening of the leading edge of an impeller blade or sail to the shroud.

An output shaft 26 is rotatably supported by means of a pair of support pillars 28 and 30 from the support platform 12. A rotating shroud 32, made of a relatively thin wall cylindrical tubular member of thin steel, aluminum, or rigid plastic, is supported from the output shaft 26 by spoke-like metallic rods 34, four in number in the example of structure illustrated at FIGS. 3-5 and 7, connecting the output shaft 26, proximate each of its ends, to a pair of support rings 36 and 38, each fitted at one end of the shroud 32 and fastened thereto such as by welding or any other fastening means, such as screws or bolts (FIGS. 5 and 7).

Flexible impeller blades, or sails, 40 are mounted within the shroud 32, generally radially between the output shaft 26 and the interior surface of the shroud. The effect of the impeller blades or sails 40, when wind is flowing longitudinally through the shroud 32, is to cause the shroud 32 and the output shaft 26 to rotate in unison.

As shown at FIG. 1, the output shaft 26 is coupled at its rear projecting end to an electrical generator 42, by any convenient means such as the pulley and drive belt assembly 44. The generator 42 may be an AC or DC power generator, as required, and its output line 45 is conveniently connected to a utilization line 46 by means of the collector ring and brush assembly schematically shown at 47, permitting the platform 12 to rotate relative to a base 48 mounted on the top of the superstructure 14, without twisting the utilization line. As schematically illustrated, the platform 12 is rotatably supported from the stationary base 48 by means of thrust ball bearing 50, and ball bearing-provided retaining ring 52.

The platform 12 is oriented relative to the stationary base 48 supported by the superstructure 14 by means of a servo motor 54, such as a hydraulic or electrical servo motor, actuating in rotation an output shaft 56 affixed below the platform 12 at its center of rotation. It will be appreciated that other means may be used for driving the platform 12 in rotation, such as hydraulic jacks, a gear motor driving the platform through a toothed ring, or the like.

A remote control unit, or wind direction detector, 58 which, in the structure illustrated, takes the form of a freely rotatable platform 60 mounted on a stationary platform 62 affixed to the top of a support column 64, is oriented, by means of a fin or vane 66 mounted on the freely rotatable platform 60, in alignment with the direction of the wind. The remote control unit 58 is provided with an angular position transducer 68 which provides an electrical output, for example, which is representative of the angular orientation of the freely rotatable platform 60. The signal from the angular position transducer is applied through a line 70 to an input of a comparator 72. A second signal, representative of the angular orientation of the platform 12, is supplied by a position indicator or transducer 74 through a line 76 to the second input of the comparator 72. The comparator 72 provides at its output a signal proportional to the difference between its two input signals, that is a signal, representing the difference in angular position between the rotatable platform 60 of the wind direction detector remote control unit 58 and the instantaneous angular position of the platform 12. The output signal from the comparator 72, after amplification through an amplifier 78, is applied to the input of a servo control 80 which in turn commands the servo motor 54 to rotate the platform 12, such that its angular position corresponds to that of the freely rotatable platform 60 of the wind direction detector unit 58, the direction of rotation of the platform 12 being determined by the algebraic sign of the signal at the output of the comparator 72. Appropriate delay or damping means, or an appropriate threshold bias for the amplifier 78, may be provided to prevent small amplitude angular oscillations of the platform 60 freely orientable by the wind fin or vane 66 to operate the rotation of the platform 12 needlessly, and appropriate damping circuits may be incorporated such as to prevent hunting and instability of the system.

A wind velocity indicator 82, taking for example the form of a venturi or a pitot static tube, is also mounted on the wind orientable platform 60, such as to generally face the wind direction, and through a wind velocity detector 84 applies, via a line 86, a signal representative of the wind velocity to an input of a comparator 88. The comparator 88 compares that signal to a reference signal, for example to a reference voltage obtained from a voltage divider comprising a DC voltage source 90 and a potentiometer 92, which is applied to the second input of the comparator 88. The reference voltage is representative of a predetermined wind velocity upper limit and, as soon as the wind velocity measured by the wind velocity transistor 82 exceeds the limit, the comparator 88 produces an output signal which, after amplification through an amplifier 94, is applied to the servo control 96 which in turn operates the servo motor 98. The servo motor 98 in turn partially closes the clam shells or the air flow throttling means 20 of the variable rate induction assembly 18 disposed at the inlet of the housing 16 and shroud 32, such as to limit the air flow through the shroud 32 of the wind turbine 10.

Figure 2:
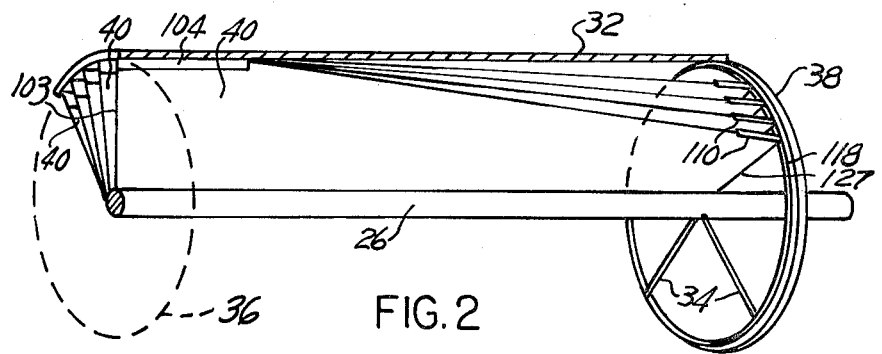
FIG. 2 is a perspective schematic partial view of the impeller output shaft assembly thereof.
Figure 6:
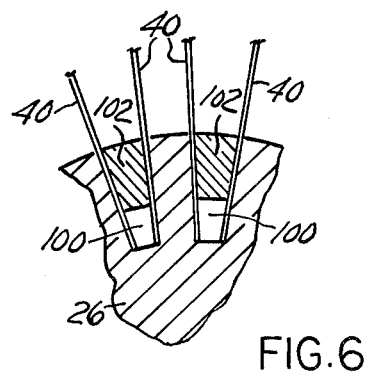
FIG. 6 is a partial transverse section through the output shaft showing the mounting of the impeller blades or sails to the shaft.

As illustrated schematically at FIG. 2, and in more details at FIGS. 4–8, each impeller blade or sail 40 is made of a substantially rectangular relatively thin sheet of flexible material, such as thin aluminum foil, thin plastic sheet, or even canvas. Each flexible blade or sail 40 is attached to the drive shaft 26 at one of its long sides, parallel to the longitudinal axis of the drive shaft. For example, as shown at FIG. 6, the drive shaft 26 is provided with a plurality of longitudinally aligned key slots 100, and a portion of each flexible blade or sail 40 proximate one lateral edge is clamped between a side wall of the key slot 100 and a wedge 102 pressfitted in the key slot 100. Any other appropriate means may be used to attach the lateral edge of the flexible blade or sail 40 to the output shaft 26, such as cementing, welding, mounting brackets and the like.

Figure 8:
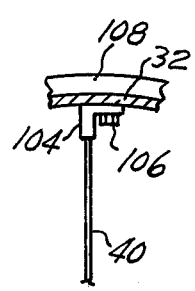
FIG. 8 is a view from line 8—8 of FIG. 7.

A portion of the other lateral edge of each flexible blade or sail 40, for example approximately one third of the length of the other lateral edge from the leading edge 103 of the blade or sail, is attached to the inner surface of the shroud 32, parallel to the longitudinal axes of the shroud 32 and output shaft 26. In such manner, the leading edge 103 of each blade or sail 40 is readily stretched between the output shaft 26 and the interior surface of the concentric shroud 32, and the portion of the chord of each blade or sail 40, to approximately one third of the length of each blade or sail from its leading edge 103, is similarly disposed in the same radial plane as the leading edge 103. However, it will be appreciated that if it is desired to give a certain amount of pitch to the portion of the plane of each blade or sail 40 situated immediately behind the leading edge 103, the lateral edge of the blade or sail 40 attached to the interior surface of the shroud 32 may be attached at an angle relative to the longitudinal axes of the output shaft 26 and the shroud 32. For the purpose of affixing to the interior surface of the shroud 32, each blade or sail 40 is provided at its outer lateral edge with an angled bracket 104, clamped, cemented, or welded along a portion of the lateral edge, and fastened to the interior surface of the shroud 32 by welding, or preferably and as shown at FIGS. 7 and 8, by screws or bolts 106 each passed through an appropriate mounting hole through the wall of the shroud 32 and threading at its end in an appropriate threaded bore disposed in a concentric reinforcing mounting ring 108, placed around the periphery of the shroud.

Figure 4:
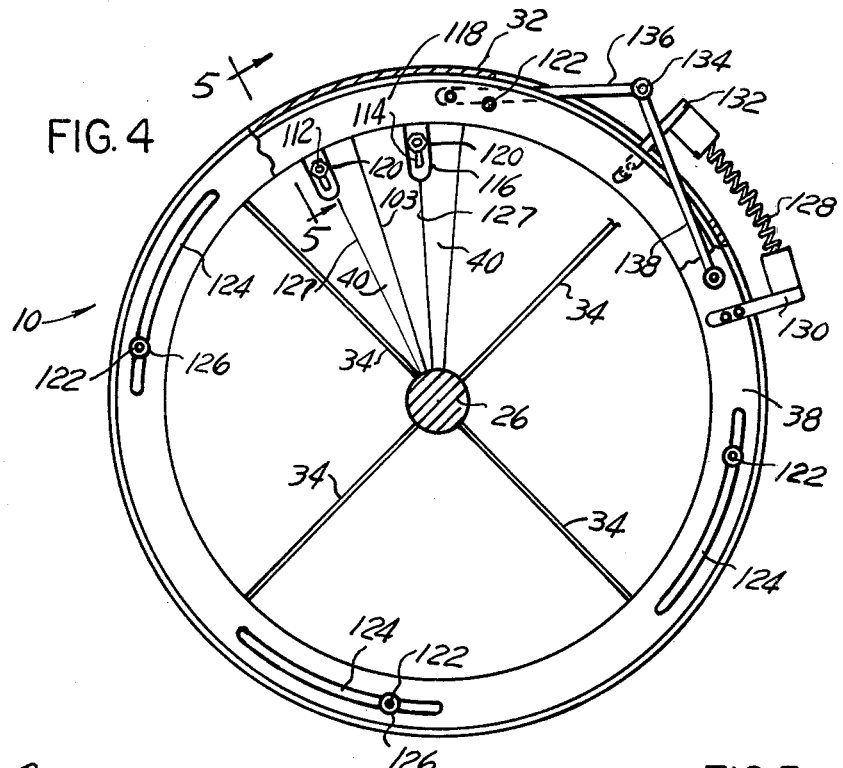
FIG. 4 is a partial rear end view from line 4—4 of FIG. 1, with portions broken away.
Figure 5:
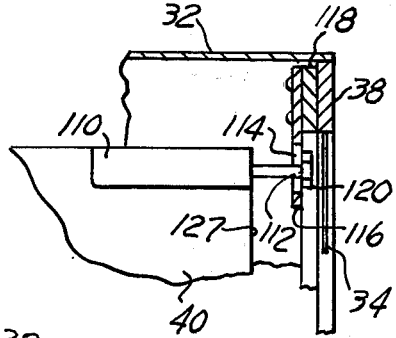
FIG. 5 is a partial longitudinal sectional view from line 5—5 of FIG. 4.

As shown schematically at FIG. 2, the remaining of the length of the lateral edge of each flexible blade or sail 40 adjoining the inner surface of the shroud 32 is free, and the rear end thereof is provided with a stud 110, clamped, cemented or welded thereto which, as best shown at FIGS. 4–5, has a threaded end 112 projecting through a slot 114 in a bracket 116 mounted radially on a pitch adjusting ring 118, a nut 120 threading on the threaded end 112 of the stud 110 holding the stud in the slot 114.

As further shown at FIGS. 4–5, the pitch adjusting ring 118 is mounted rotatable relative to the rear support ring 38 by being provided with laterally projecting pins 122 passed through arcuate slots 124 formed in the mounting ring 38, clips 126 or other fastening means mounted on the end of the pins 122 preventing the rings 118 and 38 from separating. In such manner, when the pitch adjusting ring 118 is rotated in a counter-clockwise direction, as seen at FIG. 4, relative to the support ring 38, the trailing edge 127 of each blade or sail 40, which is fastened at its corner by means of the stud 112 to the pitch adjusting ring 118, is also displaced counter-clockwise as seen at FIG. 4, thus causing a certain amount of pitch, as schematically illustrated at FIG. 3 to be applied to the surface of the free length of each flexible blade or sail 40.

Appropriate biasing means, in the form of a coil spring 128, for example, working in compression and having an end supported by a bracket 130 mounted on the support ring 38 and another end supported by a bracket 132 mounted on the pitch adjusting ring 118, normally urges the pitch adjusting ring 118 to a full counter-clockwise position relative to the support ring 38, thus in turn urging the trailing edges 127 of the plurality of flexible impeller blades or sails 40 to a position providing maximum pitch. A centrifugal weight 134 is mounted on the pivoting ends of a pair of scissor-like disposed links or arms 136 and 138. The other end of the arm 136 is pivotably attached to the pitch adjusting ring 118, while the other end of the arm 138 is pivotably attached to the support ring 38. When the speed of revolution of the assembly consisting of the output shaft 26 and the shroud 32, linked together by means of the spoke-like connecting rods 34, reaches a predetermined value counteracting the biasing force of the spring 132, the centrifugal force cause the pitch shifting ring 118 to be displaced clockwise relative to the support ring 38, thus resulting in a reduction in the pitch of the impeller flexible blades or sails 40, with the result that the angular velocity of the elements rotating in unison remains constant irrespective of wind velocity within a predetermined range, the pitch of the flexible impeller blades or sails 40 tending toward a minimum when the wind velocity tends toward a maximum. Beyond the predetermined maximum value of wind velocity, as previously explained, the wind velocity detector 82–84, FIG. 1, operates the servo motor 98 to throttle the air flow through the wind turbine 10, for example by decreasing the frontal area thereof by means of appropriate clam shells or by means of the iris diaphragm 24 schematically illustrated at FIG. 3.

It will be appreciated that the spring 128 acts in compression and that the spring 128 and the centrifugally-actuated regulating mechanism comprising the weight 134 and the pivoting arms 136 and 138 preferably consists of a pair of such assemblies, diametrically disposed so as to counterbalance each other and prevent vibration of the parts in rotation.

Although the present invention has, hereinbefore, been described in the term of a wind-actuated energy producing device, it will be readily apparent to those skilled in the art that the same principles may be applied to water flow-actuated power generating devices. Such an application is illustrated at FIGS. 9–10 showing a turbine 10 structurally similar to the example of turbine 10 hereinbefore described disposed retracted in a well 140, FIG. 9, in the hull 142 of a floating barge or vessel, and extended therefrom, FIG. 10, below the hull 142 for driving by water current, the hull 142 being anchored in an appropriate location in a river or in tidal waters. The turbine 10 is supported at both ends of its output shaft 26 by means of appropriate bearings on each end of a pair of retractable columns or posts 144, and a hydraulic pump 146, for example, is coupled to the output shaft 26. The hydraulic pump 146 drives a hydraulic motor 148, disposed in the hull 142 or on the deck, the hydraulic motor 148 in turn driving an electric generator 150. Part of the power supplied by the hydraulic motor 146 may be appropriately accumulated to supply energy to drive the support posts 144 for retracting the turbine 10 into the well 140 or extending the turbine from the well, as required.

Having thus described the present invention by way of examples of structural embodiment thereof, given for illustrative purpose only, what is claimed as new is as follows:

1. A reaction-type turbine rotatable by fluid flow longitudinally therethrough, said turbine comprising a rotatable output shaft, a rotatable tubular shroud disposed concentric to said output shaft, means rigidly interconnecting said output shaft and said tubular shroud for rotation in unison, and a plurality of flexible impeller blades disposed radially between said output shaft and the interior surface of said tubular shroud, said flexible impeller blades having a leading edge, a trailing edge and a pair of opposed lateral edges, one of said lateral edges being fixedly attached to said output shaft and a portion of the other of said lateral edges proximate said leading edge being fixedly attached to the interior surface of said tubular shroud, and means for controllably uniformly varying the pitch of said impeller blades by displacing the peripheral corner of the trailing edge of said blades such as to place said trailing edge at an angle to the leading edge of said blade.

2. The reaction-type turbine of claim 1 wherein said means for controllably varying the pitch of said impeller blades comprises a pitch control ring and means attaching the peripheral corner of said trailing edge to said pitch control ring, said pitch control ring being angularly orientable around the axes of said output shaft and shroud from a first position providing minimum pitch to a second position providing maximum pitch.

3. The reaction-type turbine of claim 2 wherein said pitch control ring is rotatably angularly displaced from said second position of maximum pitch towards said first position of minimum pitch as a function of angular velocity by means of centrifugal force.

4. The reaction-type turbine of claim 1 wherein said turbine is mounted on a platform orientable about a substantially vertical axis, and further comprising remotely located wind direction detecting means, and drive means controlled by said wind direction detection means for orienting said platform in the direction of prevalent wind air flow.

5. The reaction-type turbine of claim 4 further comprising funnel-shaped induction means directing the wind air flow through said tubular shroud.

6. The reaction-type turbine of claim 4 further comprising remotely located wind velocity detection means for throttling the air flow into said tubular shroud.

7. The reaction-type turbine of claim 6 further comprising funnel-shaped induction means directing the wind air flow through said tubular shroud.

8. The reaction-type turbine of claim 6 wherein said wind direction detection means and said wind velocity detection means are mounted on a common base free to orient itself in the direction of prevalent wind air flow.

9. The reaction-type turbine of claim 1 wherein said output shaft is coupled to an electrical generator.

10. The reaction-type turbine of claim 1 further comprising a water flotation hull, telescopic support means for said output shaft and means for operating said telescoping support means for extending said turbine into the water or removing said turbine from the water.

11. The reaction-type turbine of claim 11 wherein a fluid pump is coupled to said output shaft.

12. The reaction-type turbine of claim 10 further comprising a fluid motor disposed in said hull and actuated by said fluid pump, and an electrical generator coupled to said fluid motor.

UNITED STATES PATENT AND TRADEMARK OFFICE
CERTIFICATE OF CORRECTION

PATENT NO. : 4,213,734
DATED : July 22, 1980
INVENTOR(S) : Jerry W. Lagg

It is certified that error appears in the above-identified patent and that said Letters Patent are hereby corrected as shown below:

Column 8, line 4, change "claim 11" to --claim 10--;

line 6, change "claim 10" to -- claim 11 --.

Signed and Sealed this

Twenty-fifth Day of November 1980

[SEAL]

Attest:

SIDNEY A. DIAMOND

Attesting Officer

Commissioner of Patents and Trademarks